(12) United States Patent
Kamano

(10) Patent No.: US 7,240,914 B1
(45) Date of Patent: Jul. 10, 2007

(54) ROOF SIDE GARNISH PERIPHERAL STRUCTURE OF AUTOMOBILE

(75) Inventor: Yoshifumi Kamano, Fuji (JP)

(73) Assignee: Nihon Plast Co., Ltd., Fuji (JP)

( * ) Notice: Subject to any disclaimer, the term of this patent is extended or adjusted under 35 U.S.C. 154(b) by 0 days.

(21) Appl. No.: 11/626,851

(22) Filed: Jan. 25, 2007

(30) Foreign Application Priority Data

Jan. 30, 2006 (JP) ............................. 2006-021232

(51) Int. Cl.
*B60R 21/16* (2006.01)

(52) U.S. Cl. .................... 280/728.2; 280/730.2

(58) Field of Classification Search .......... 280/728.2, 280/730.2
See application file for complete search history.

(56) References Cited

U.S. PATENT DOCUMENTS

| | | | |
|---|---|---|---|
| 6,302,434 B2 * | 10/2001 | Nakajima et al. ......... | 280/730.2 |
| 6,333,515 B1 * | 12/2001 | Kubota et al. ........... | 280/730.2 |
| 6,334,626 B2 * | 1/2002 | Nakajima et al. ........ | 280/730.2 |
| 6,485,048 B2 * | 11/2002 | Tajima et al. ............. | 280/728.2 |
| 6,502,855 B1 * | 1/2003 | Greiner et al. ........... | 280/730.2 |
| RE38,125 E * | 5/2003 | Shibata et al. ........... | 280/730.2 |
| 6,565,117 B2 * | 5/2003 | Kubota et al. ........... | 280/730.2 |
| 6,722,693 B2 * | 4/2004 | Ikeda et al. .............. | 280/730.2 |
| 6,974,151 B2 * | 12/2005 | Ochiai et al. ............ | 280/728.2 |
| 6,974,152 B2 * | 12/2005 | Hanjono ................... | 280/728.3 |
| 7,025,377 B2 * | 4/2006 | Ryu ......................... | 280/730.2 |

FOREIGN PATENT DOCUMENTS

| | | |
|---|---|---|
| JP | 2000-071925 | 3/2000 |
| JP | 2001-213261 | 8/2001 |

* cited by examiner

*Primary Examiner*—Faye M. Fleming
(74) *Attorney, Agent, or Firm*—NDQ&M Watchstone LLP; S. Peter Konzel

(57) ABSTRACT

A roof side garnish peripheral structure of an automobile includes: a roof side garnish (9) mounted on an inner side of a side roof rail (1) from an inner side of a passenger room, the roof side garnish (9) being provided at its outer side in a widthwise direction of the vehicle with a cover portion (11) capable of opening inward of the passenger room; a duct member (12) bonded to an outer side of the roof side garnish (9) at an upper location than the cover portion (11) of the roof side garnish (9); a duct passage (13) of closed cross section formed by the duct member (12) and the roof side garnish (9); a support portion (25) extending from an outer end of the duct member (12) in the widthwise direction of the vehicle, the support portion (25) having a tip end extending close to the side roof rail (1); and an accommodation space (S) defined by the support portion (25), the side roof rail (1) and the cover portion (11) so as to accommodate an air-bag (4).

4 Claims, 4 Drawing Sheets

ROOF SIDE GARNISH PERIPHERAL STRUCTURE OF AUTOMOBILE

BACKGROUND OF THE INVENTION

1. Field of the Invention

The present invention relates to a roof side garnish peripheral structure of an automobile.

2. Description of the Related Art

A roof side garnish for covering a side roof rail from inside of a passenger room is mounted on the side roof rail of an upper portion of a vehicle body of an automobile. A folded side air-bag and a duct of an air conditioner are accommodated in a space between the side roof rail and the roof side garnish along a longitudinal direction.

The air-bag is mounted in a manner that the air-bag is sandwiched by a bracket formed on a back side so as to extend from an end of the roof side garnish through a plurality of hinges and in this state, a superposed portion of the bracket is fastened together with the side roof rail when the roof side garnish is mounted. This structure is disclosed in a Japanese Patent Application Laid-open No. 2000-71925.

The duct of the air conditioner is formed into a cylindrical shape as a separate member from the roof side garnish, and the duct is previously mounted on the side roof rail through a special mounting bracket before the roof side garnish is mounted. This structure is disclosed in another Japanese Patent Application Laid-open No. 2001-213261.

According to these conventional techniques, however, the air-bag is sandwiched by the bracket that is formed so as to extend from the end of the roof side garnish through the hinges and in this state, the air-bag is mounted on the side roof rail together with the roof side garnish. Therefore, it is troublesome to mount the air-bag.

Further, it is necessary to previously mount the cylindrical duct on the side roof rail before the roof side garnish is mounted on the side roof rail. Since many steps for mounting the roof side garnish are required on the assembling line, the mounting operation is inefficient.

SUMMARY OF THE INVENTION

The present invention has been achieved in view of the above conventional problems, and an object of the invention is to provide a roof side garnish peripheral structure of an automobile by which an air-bag and a roof side garnish can be easily mounted on a side roof rail of the automobile.

A first aspect of the present invention provides a roof side garnish peripheral structure of an automobile, comprising: a roof side garnish (9) mounted on an inner side of a side roof rail (1) from an inner side of a passenger room, the roof side garnish (9) being provided at its outer side in a widthwise direction of the vehicle with a cover portion (11) capable of opening inward of the passenger room; a duct member (12) bonded to an outer side of the roof side garnish (9) at an upper location than the cover portion (11) of the roof side garnish (9); a duct passage (13) of closed cross section formed by the duct member (12) and the roof side garnish (9); a support portion (25) extending from an outer end of the duct member (12) in the widthwise direction of the vehicle, the support portion (25) having a tip end extending close to the side roof rail (1); and an accommodation space (S) defined by the support portion (25), the side roof rail (1) and the cover portion (11), and an air-bag (4) being accommodated in the accommodation space (S).

According to the first aspect of the invention, since the roof side garnish is mounted on the side roof rail in a state where the air-bag is sandwiched between the support portion and the cover portion, the air-bag is held in the accommodation space defined by the three elements, i.e., the support portion, the side roof rail, and the cover portion. The mounting operation of the air-bag is completed in this manner, thereby making it easy to mount the air-bag. Further, the duct passage having the closed cross section is integrally formed by bonding the duct member on the back side of the roof side garnish. Therefore, by mounting the roof side garnish on the side roof rail, the mounting operation of the duct passage is also completed at the same time, thereby improving the operating efficiency.

A second aspect of the present invention provides the roof side garnish peripheral structure according to the first aspect, further comprising: a rib (26) for connecting the duct member (12) and the support portion (25) to each other.

According to the second aspect of the invention, since the duct member and the support portion are connected to each other through the rib, the rigidity of the support portion and the holding force of the air-bag are increased.

A third aspect of the present invention provides the roof side garnish peripheral structure according to the first aspect or the second aspect, further comprising: a holding portion (28) that is formed outside of the cover portion (11) so that the holding portion (28) is in contact with and along a side surface of the folded air-bag.

According to the third aspect of the invention, since the holder portion is formed on the back side of the cover portion, the air-bag sandwiched between the cover portion and the support portion is more stabilized.

A fourth aspect of the present invention provides the roof side garnish peripheral structure according to one aspect among the first aspect to the third aspect, further comprising: an engaging portion (16) formed outside of the duct member (12); and a to-be engaged portion (17) formed at a portion corresponding to the engaging portion (16) of the side roof rail (1), wherein the roof side garnish (9) can be mounted on the side roof rail (1) by inserting and engaging the engaging portion (16) into and with the to-be engaged portion (17) from inside of the passenger room.

According to the fourth aspect of the invention, by inserting and engaging the engaging portion of the duct member into and with the to-be engaged portion of the side roof rail from the inner side of the passenger room, the roof side garnish can be mounted on the side roof rail, thereby making it easy to mount the roof side garnish.

DETAILED DESCRIPTION OF THE PREFERRED EMBODIMENTS

It is an object of the present invention to provide a roof side garnish peripheral structure of an automobile. According to the structure, an air-bag and a roof side garnish can be easily mounted on a side roof rail of the automobile. And this object has been achieved in the following manner. That is, a duct member is bonded to a back side of a roof side garnish mounted on the side roof rail from an inner side of a passenger room in a state where a cover portion capable of opening into the passenger room at an outer portion of the roof side garnish remains, a duct passage having a closed cross section is formed by the duct member and the roof side garnish, a support portion that supports a folded air-bag between the support portion and a cover portion is extended from an outer end of the duct member in the widthwise direction of the vehicle, a tip end of the support portion is brought close to the side roof rail, and an accommodation space of the air-bag is defined by three members, i.e., the support portion, the side roof rail and the cover portion. Embodiments of the present invention will be explained below with reference to the accompanying drawings.

Embodiments

Figure 1:
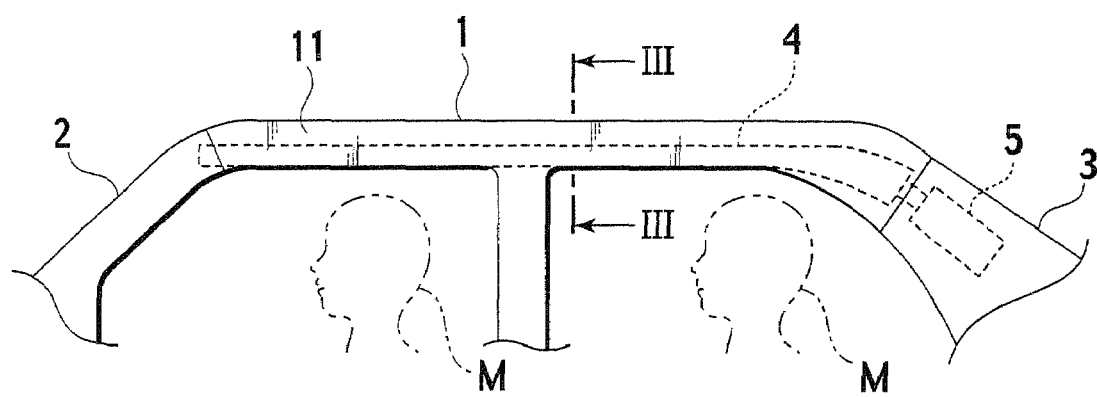
FIG. 1 is a side view of a roof side garnish peripheral structure according to an embodiment of the present invention as viewed from inside of a passenger room.
Figure 2:
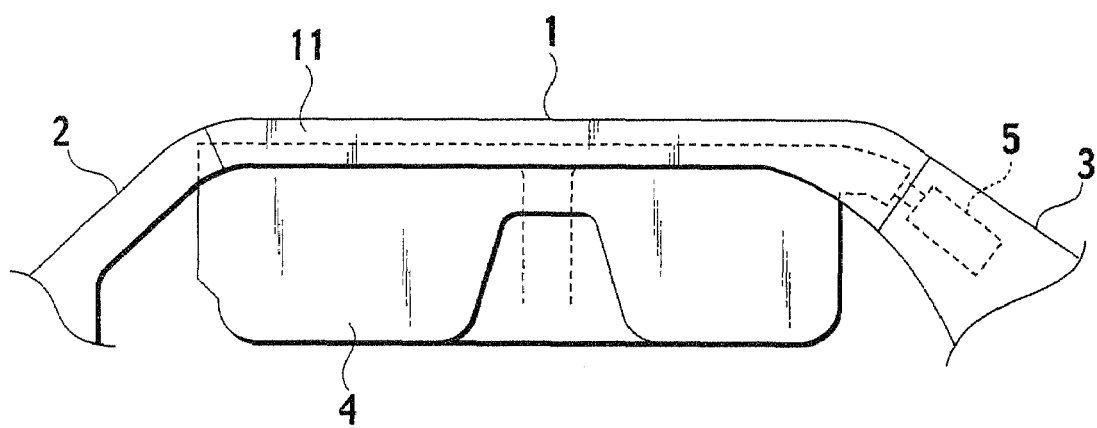
FIG. 2 is a side view corresponding to FIG. 1, where an air-bag is developed downwardly.
Figure 3:
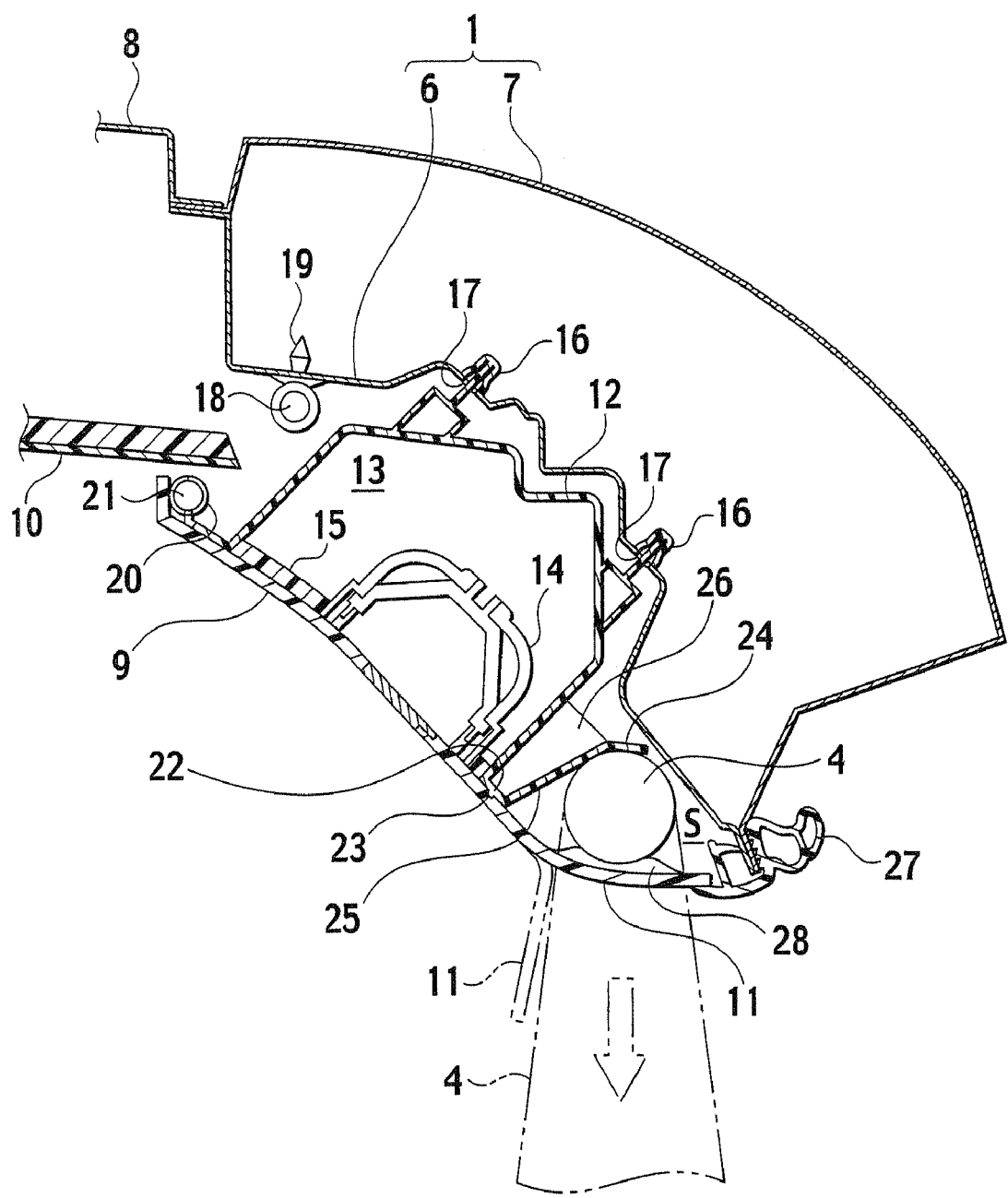
FIG. 3 is a sectional view taken along the line III-III in FIG. 1.
Figure 4:
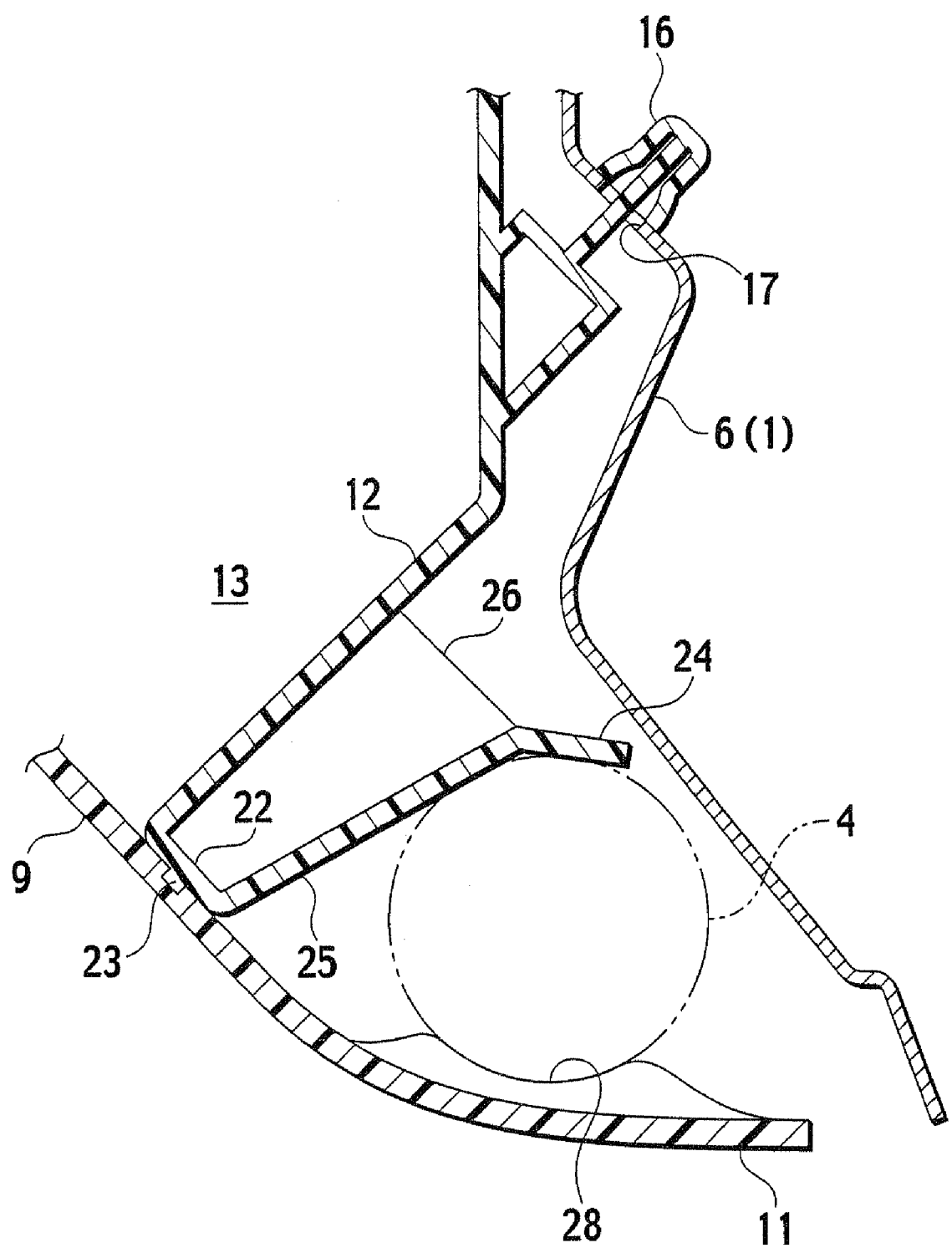
FIG. 4 is a sectional view showing an air-bag sandwiched by a support portion of a duct member and a cover portion in FIG. 3.
Figure 5:
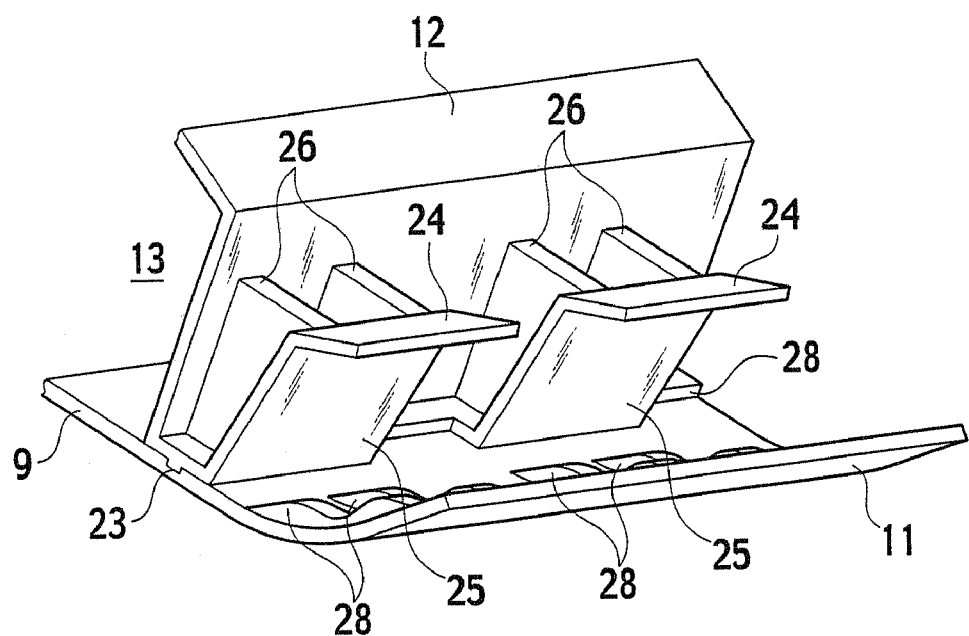
FIG. 5 is a perspective view of the support portion shown in FIGS. 3 and 4.
Figure 6:
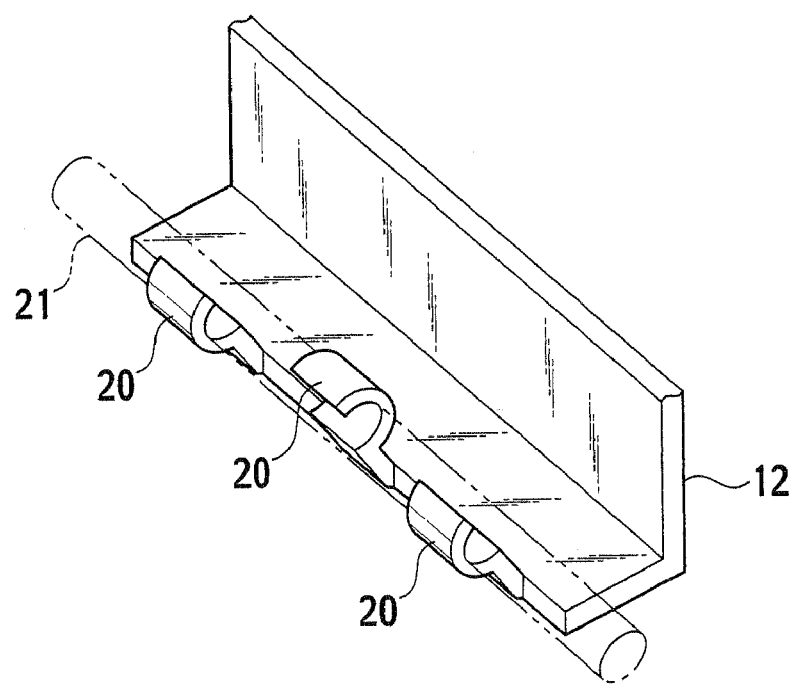
FIG. 6 is a perspective view of a holder portion of the duct member shown in FIG. 3.

Referring now to FIGS. 1 to 6, details of an embodiment of the present invention will be described hereinafter. FIG. 1 shows an upper portion of an automobile as viewed from inside of a passenger room. A side air-bag 4 is disposed in a folded state on a side roof rail 1 located at a height near a head of a passenger M along a longitudinal direction from a front pillar 2 to a rear pillar 3. An inflator 5 disposed in the rear pillar 3 is connected to a rear end of the air-bag 4. FIG. 2 shows a state where the air-bag 4 is developed downward in a form of a curtain.

The side roof rail 1 has a closed cross section structure comprising a side roof rail inner 6 and a side roof rail outer 7. A roof panel 8 is connected to an inner end of the side roof rail 1 in the widthwise direction of the vehicle.

A roof side garnish 9 made of resin for covering the side roof rail inner 6 from inside of the passenger room is mounted on the inner side of the passenger room of the side roof rail inner 6. A headlining 10 is mounted on an inner side of the roof side garnish 9 in the widthwise direction of the vehicle.

A substantially hat-shaped (opened cross section) duct member 12 is welded on a back side of the roof side garnish 9 while leaving a cover portion 11 on the outer side in the widthwise direction of the vehicle. By welding the duct member 12, a duct passage 13 of closed cross section that is continuous in the longitudinal direction is formed by the duct member 12 and the portion of the roof side garnish 9 corresponding to the duct member 12. Air conditioned air is sent into the duct passage 13. The roof side garnish 9 inside of the duct passage 13 is provided with an air blowoff structure 14, and a heat insulator 15 is provided around the air blowoff structure 14.

A top portion of the duct member 12 is of substantially mountain-like shape, and the side roof rail inner 6 also has the corresponding shape thereto. A plurality of pairs of clips (engaging portions) 16 are formed at the top portion of the duct member 12 at predetermined intervals from one another in the longitudinal direction. Engaging holes (to-be engaged portions) 17 are formed on the corresponding portions of the side roof rail inner 6 to the clips 16.

A harness 18 is mounted on an inner side of the side roof rail inner 6 in the widthwise direction of the vehicle by a grommet 19. Mutually opposed semi-circular holder portions 20 (see FIG. 6) are formed on the inner surface of the duct member 12 in the widthwise direction of the vehicle, and a cylindrical light source 21 is held by the holder portions 20.

An outer end 22 of the duct member 12 in the widthwise direction of the vehicle is strongly welded on the back side of the roof side garnish 9 by a welding rib 23. A support portion 25 whose tip end 24 is bent is extended so as to rise from an outer end 22 of the duct member 12 in the widthwise direction of the vehicle. A plurality of support portions 25 are formed at predetermined intervals from one another in a state where the support portions 25 and the cover portion 11 are opposed to each other. The support portion 25 and the duct member 12 are connected to each other through a pair of ribs 26.

While the cover portion 11 of the roof side garnish 9 is normally pressed from below by a weather strip 27 provided on the outer end of the side roof rail 1 in the widthwise direction of the vehicle, the cover portion 11 is flexible so that the cover portion 11 can be deformed inward of the passenger room around a portion thereof welded to the duct member 12 when a downward load is applied. Rib-like holding portions 28 are formed on a back side of the cover portion 11 at locations corresponding to the support portions 25. The holding portion 28 has a curved end surface corresponding to a side surface of the air-bag 4.

An assembling method of the roof side garnish 9 on the side roof rail 1 is explained next. The folded air-bag 4 is mounted on the roof side garnish 9 on which the duct member 12 is integrally welded. The air-bag 4 is mounted in such a manner that the air-bag 4 is sandwiched between the support portion 25 and the cover portion 11. Since the mounting of the air-bag 4 on the roof side garnish 9 is completed only by sandwiching the air-bag 4 between the support portion 25 and the cover portion 11, the mounting operation is easy.

Since the support portion 25 and the duct member 12 are connected to each other through the rib 26, the rigidity of the support portion 25 and the sandwiching force (holding force) of the air-bag 4 are enhanced. Since the holding portion 28 having such a shape that is in contact along the side surface of the air-bag 4 is formed on the back side of the cover portion 11, the air-bag 4 sandwiched between the support portion 25 and the cover portion 11 is more stabilized. The light source 21 is also mounted on the holder portions 20.

The air-bag 4 and the light source 21 are set on the roof side garnish 9, the roof side garnish 9 is positioned with respect to the side roof rail inner 6, and the clip 16 formed on the duct member 12 is inserted into and engaged with the engaging hole 17 of the side roof rail inner 6. If the clips 16 are inserted into the engaging holes 17 and the clips 16 are engaged with the engaging holes 17, the clip 16 is prevented from falling out. Therefore, the roof side garnish 9 and the duct member 12 are mounted with respect to the side roof rail 1. Since the roof side garnish 9 can be mounted only by inserting the clips 16 into the engaging holes 17, the mounting operation is easy.

In a state where the roof side garnish 9 is mounted to the side roof rail 1, a tip end of the cover portion 11 is pressed by the weather strip 27. By mounting the roof side garnish 9 in this manner, the tip end 24 of the support portion 25 comes close to the side roof rail inner 6, and an accommodation space S defined by three members, i.e., the support portion 25, the side roof rail 1 and the cover portion 11 is formed. The air-bag 4 sandwiched between the support portion 25 and the cover portion 11 is stored so as to be held in the accommodation space S.

If side-impact of the automobile occurs, gas is injected from the inflator 5 and the air-bag 4 expands. Since the air-bag 4 stored in the accommodation space S can not expand toward the upper side support portion 25 or side roof rail inner 6, the air-bag 4 pushes and opens the cover portion 11 downwardly. The air-bag 4 is developed downwardly in the form of a curtain, so that the side-impact of the automobile afforded to passengers are absorbed by the developed air-bag 4.

As explained above, according to this embodiment, the roof side garnish 9 is mounted on the side roof rail 1 in the state where the air-bag 4 is sandwiched between the support portion 25 and the cover portion 11, and the air-bag 4 is stored in the accommodation space S defined by the three elements, i.e., the support portion 25, the side roof rail 1 and the cover portion 11. Since the mounting operation of the air-bag 4 is completed in this manner, it is easy to mount the air-bag 4.

Since the duct passage 13 is integrally formed by bonding the duct member 12 to the back side of the roof side garnish 9, the mounting operation of the duct passage 13 is also completed by mounting the roof side garnish 9 on the side roof rail 1, thereby improving the operating efficiency.

Although the plurality of support portions 25 are formed along the longitudinal direction at predetermined intervals from each other in the embodiment, a support portion that is continuous in the longitudinal direction can be integrally formed. Although the duct member 12 has the substantially hat-like shape (opened cross section), the duct member 12 can have a closed cross section.

The entire contents of Japanese Patent Application No. P2006-021232 (filed on Jan. 30, 2006) are incorporated herein by reference.

While preferred embodiments of the present invention have been described using specific terms, such description is for illustrative purposes, and it is to be understood that changes and variations may be made without departing from the scope of the following claims.

What is claimed is:

1. A roof side garnish peripheral structure of an automobile, comprising:

a roof side garnish mounted on an inner side of a side roof rail from an inner side of a passenger room, the roof side garnish being provided at its outer side in a widthwise direction of the vehicle with a cover portion capable of opening inward of the passenger room;

a duct member bonded to an outer side of the roof side garnish at an upper location than the cover portion of the roof side garnish;

a duct passage of closed cross section formed by the duct member and the roof side garnish;

a support portion extending from an outer end of the duct member in the widthwise direction of the vehicle, the support portion having a tip end extending close to the side roof rail; and an accommodation space defined by the support portion, the side roof rail and the cover portion, and an air-bag being accommodated in the accommodation space.

2. The roof side garnish peripheral structure according to claim 1, further comprising:

a rib to connect the duct member and the support portion to each other.

3. The roof side garnish peripheral structure according to claim 1, further comprising:

a holding portion formed outside of the cover portion so that the holding portion is in contact with and along a side surface of the folded air-bag.

4. The roof side garnish peripheral structure according to claim 1, further comprising:

an engaging portion formed outside of the duct member; and a to-be engaged portion formed at a portion corresponding to the engaging portion of the side roof rail, wherein the roof side garnish can be mounted on the side roof rail by inserting and engaging the engaging portion into and with the to-be engaged portion from inside of the passenger room.

* * * * *